United States Patent Office 2,856,260
Patented Oct. 14, 1958

2,856,260

METHOD FOR PREPARING ANHYDROUS SODIUM BOROHYDRIDE

Robert W. Bragdon, Marblehead, Mass., assignor to Metal Hydrides Incorporated, Beverly, Mass., a corporation of Massachusetts No Drawing. Application April 3, 1956
Serial No. 575,704

1 Claim. (Cl. 23—14)

The present invention relates to the preparation of sodium borohydride of high purity. More particularly the invention relates to a method for purifying a crude sodium borohydride obtained by separation from a reaction mixture of sodium borohydride and sodium methoxide. This reaction mixture may be prepared in known manner by reacting sodium hydride with either methyl borate or sodium trimethoxyborohydride as illustrated by the equations:

$$4NaH + B(OCH_3)_3 \rightarrow NaBH_4 + 3NaOCH_3 \quad (1)$$
$$3NaH + NaBH(OCH_3)_3 \rightarrow NaBH_4 + 3NaOCH_3 \quad (2)$$

One method for separating the sodium borohydride from such a reaction mixture is to treat the latter with a solvent for sodium borohydride in which sodium methoxide is substantially insoluble, such as isopropylamine. This solvent treatment produces a liquor comprising a solution of sodium borohydride in the solvent and a solid residue. The solution is separated and the solvent is removed, as by evaporation, to obtain a crude solid sodium borohydride. This crude product usually contains from about 88 to 92 percent by weight of sodium borohydride and its purity is unsatisfactory for many commercial uses.

In a copending application of James B. Vetrano and Robert W. Bragdon Serial No. 504,676, filed April 28, 1955, a method is described for obtaining anhydrous sodium borohydride by crystallization from an aqueous solution containing a predetermined concentration of sodium hydroxide, such as about 15 to 17 percent by weight. The solution is heated to a temperature substantially greater than a predetermined lower crystallization temperature and the crude sodium borohydride is dissolved therein to increase its sodium borohydride content to an amount greater than is required to render the solution saturated with sodium borohydride at the predetermined crystallization temperature. The solution then is cooled to the predetermined crystallization temperature thereby causing crystals of anhydrous sodium borohydride to form. These crystals may be separated from the mother liquor in any desired manner, as by a centrifuge, and may be washed with methanol to remove the mother liquor adsorbed on the surface of the crystals. The mother liquor contains some sodium borohydride and can be reused to obtain additional anhydrous sodium borohydride crystals as above described. The mother liquor also contains sodium hydroxide and sodium metaborate in solution derived from impurities in the crude sodium borohydride. When an objectionable amount of impurities has built up in the mother liquor by repeated reuse the mother liquor is discarded after removal of the residual sodium borohydride.

The present invention makes possible the repeated reuse of the aqueous sodium hydroxide solution or mother liquor in the practice of the method described in the above mentioned copending application. The present invention is based upon the discoveries (1) that the mother liquor can become supersaturated with sodium metaborate, and (2) it is possible to crystallize sodium borohydride in pure form from the supersaturated liquor and separate the crystals of sodium borohydride without crystallization of the sodium metaborate. Further, the mother liquor then can be set aside to allow the post-crystallization of sodium metaborate. If desired, the post-crystallization can be induced by the addition of a seed of sodium metaborate. This post-crystallization step will remove the sodium metaborate in excess of that required for saturation. After the mother liquor has become supersaturated with sodium metaborate, the post-crystallization of sodium metaborate may be carried out after each cycle of steps comprising dissolving crude sodium borohydride in the hot mother liquor and cooling to crystallize out sodium borohydride but it is possible to operate for several such cycles, such as five to ten cycles, without requiring separation of the excess metaborate by post-crystallization. The post-crystallization of sodium metaborate should be conducted at a temperature not substantially less than the temperature used for the crystallization of the sodium borohydride.

As previously indicated, as the cycle of steps of the method described in the above mentioned copending application is repeated the concentration of sodium hydroxide in the mother liquor is increased by small amounts derived from impurities in the crude sodium borohydride. In accordance with another aspect of the method of the present invention, these small amounts of sodium hydroxide can be converted to sodium metaborate occasionally by the addition of a controlled amount of boric acid, the sodium metaborate thus formed being removed from the mother liquor in the post-crystallization of sodium metaborate from the superstated mother liquor. Boric acid reacts with sodium hydroxide to form sodium metaborate as illustrated by the equation:

$$H_3BO_3 + NaOH \rightarrow NaBO_2 + 2H_2O \quad (3)$$

The amount of boric acid added to the mother liquor for this purpose should not exceed the amount required to reduce the concentration of sodium hydroxide in the mother liquor to the desired concentration, that is, the previously mentioned predetermined concentration. The required amount of boric acid can be determined readily by stoichiometrical calculation after the amount of sodium hydroxide which it is desired to convert to sodium metaborate has been determined as by analysis of the mother liquor.

As pointed out in the above mentioned copending application, the permissible minimum concentration of sodium hydroxide in the solution which can be used to obtain anhydrous sodium borohydride crystals varies depending upon the temperature to which the solution is cooled for crystallization. A sodium hydroxide concentration of less than about 12 percent by weight at the predetermined crystallization temperature is not recommended. This is the minimum permissible concentration when the crystallization temperature is not less than about 25° C. The minimum permissible sodium hydroxide concentration at the crystallization temperature when the latter is 0° C. is about 22 percent by weight. The minimum permissible sodium hydroxide concentration varies substantially proportionally from about 22 percent down to about 12 percent by weight at the predetermined crystallization temperature as the latter is increased from 0° C. up to 25° C. The maximum permissible sodium hydroxide concentration is about 45 percent by weight at the predetermined crystallization temperature. If a higher concentration is used some sodium hydroxide may crystallize with the sodium borohydride during the cooling step. The upper temperature limit for desirable operation is about 80° C. It is preferred to use an upper temperature of about 70° C.

and a lower or crystallization temperature of about room temperature, that is between about 20° C. to 25° C., with a solution having a sodium hydroxide concentration of about 15 to 17 percent by weight at normal room temperature.

As previously indicated, the crude sodium borohydride to be purified by the method of the present invention is the solid product obtained by (1) treating the reaction mixture of sodium borohydride and sodium methoxide with a solvent for sodium borohydride in which sodium methoxide is substantially insoluble, such as isopropylamine, to obtain a liquor comprising a solution of sodium borohydride in the solvent and a solid residue, and (2) separating said solution and removing the solvent by evaporation to obtain a crude solid sodium borohydride. This crude solid sodium borohydride is dissolved in the hot aqueous solution or mother liquor to increase the sodium borohydride content of the latter to an amount greater than is required to render the solution saturated with sodium borohydride at the predetermined crystallization temperature. It will be obvious that instead of dissolving this crude solid sodium borohydride in the hot aqueous sodium hydroxide solution, the solution of sodium borohydride from which the crude solid sodium borohydride is obtained may be added to the hot aqueous sodium hydroxide solution and the sodium borohydride solvent removed by evaporation before the aqueous solution is cooled to the lower crystallization temperature.

The invention is illustrated further by the following specific example. 300 grams of sodium hydroxide, 200 grams of sodium metaborate and 560 grams of crude sodium borohydride of 92 percent purity were mixed with 940 grams of water. This mixture was heated to 70° C. and filtered. The clear filtrate was cooled to 25° C. to effect crystallization of sodium borohydride. The resulting crystals were collected by passing the liquor through a perforated basket centrifuge. The crystals were washed with aqueous caustic followed by methanol and were dried in a vacuum oven at 100° C. The dried product assayed 96% sodium borohydride.

The filtrate from the basket centrifuge was set aside for 16 hours to permit post-crystallization of sodium metaborate. A large crop (109 grams) of crystals formed and were collected by passing the liquor through the basket centrifuge. This crop of crystals was washed with methanol and dried in a vacuum oven at 100° C. The dried product assayed 30.7% sodium and 13.8% boron.

The filtrate then was used as a mother liquor for the purification of another batch of crude sodium borohydride. 142 grams of crude sodium borohydride of 84% purity were added to the mother liquor and then heated to 70° C. and the liquor filtered. The clear filtrate was cooled to 25° C. and the resulting crystals were recovered in a basket centrifuge. The crystals were washed with alcohol and dried in a vacuum oven at 100° C. The product assayed 97% sodium borohydride. No sodium metaborate crystallized from the filtrate.

Six more similar cycles were carried out with charges of crude sodium borohydride of 84% purity weighing between 130 to 142 grams each and yielding products assaying 96 to 98% sodium borohydride. In no case did the sodium metaborate impurity build up to the point where it crystallized out of the mother liquor.

I claim:

In a method for preparing substantially pure anhydrous sodium borohydride by crystallization from a mother liquor comprising an aqueous solution containing an amount of sodium hydroxide between predetermined minimum and maximum concentrations, said method including the cycle of steps comprising heating the solution to an upper temperature, dissolving impure sodium borohydride in said solution while so heated to increase its sodium borohydride content to an amount greater than that required to render the solution saturated with sodium borohydride at a predetermined lower temperature, cooling the heated solution to said predetermined lower temperature thereby causing crystals of anhydrous sodium borohydride to precipitate, and removing the crystals from the solution to obtain an aqueous mother liquor containing sodium borohydride and the sodium hydroxide of the original solution and sodium hydroxide and sodium metaborate derived from impurities in the impure sodium borohydride, said impure sodium borohydride being obtained by treating a reaction mixture of sodium borohydride and sodium methoxide with a solvent for sodium borohydride in which sodium methoxide is substantially insoluble to obtain a solution of sodium borohydride in the solvent and a solid residue and then separating said solution from said solid and removing the solvent from the separated solution to obtain an impure sodium borohydride, the improvement which includes the steps comprising repeating said cycle of steps until a mother liquor is obtained which contains a concentration of sodium hydroxide substantially greater than said predetermined minimum concentration but less than said predetermined maximum concentration, then introducing into the mother liquor an amount of boric acid not greater than that required to convert a desired portion of the sodium hydroxide therein to sodium metaborate, causing sodium metaborate to crystallize from the mother liquor at a temperature not substantially less than said predetermined lower temperature when the mother liquor is supersaturated with sodium metaborate, separating the solution from the crystals of sodium metaborate, and utilizing the separated solution as the aqueous solution of sodium hydroxide when repeating said cycle of steps.

References Cited in the file of this patent

UNITED STATES PATENTS

| | | |
|---|---|---|
| 1,424,447 | Burham | Aug. 1, 1922 |
| 2,744,810 | Jackson | May 8, 1956 |

OTHER REFERENCES

Schlesinger et al.: "Journal of the American Chemical Society," vol. 75, pages 205–209, Jan. 5, 1953.

Jones: "Inorganic Chemistry," 1947, page 576.

Schechter et al.: "Boron Hydrides and Related Compounds," prepared under Contract NOa(s) 10992 for Dept. of Navy, Bureau of Aeronautics, prepared by Callery Chemical Co.; printed March 1951, declassified December 1953; page 52.